US006852241B2

(12) United States Patent
Hart et al.

(10) Patent No.: US 6,852,241 B2
(45) Date of Patent: Feb. 8, 2005

(54) METHOD FOR MAKING INK JET PRINTHEADS

(75) Inventors: Brian Christopher Hart, Georgetown, KY (US); Shauna Marie Leis, Georgetown, KY (US); Gary Raymond Williams, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 276 days.

(21) Appl. No.: 09/929,849

(22) Filed: Aug. 14, 2001

(65) Prior Publication Data

US 2003/0034325 A1 Feb. 20, 2003

(51) Int. Cl.$^{7}$ ........................ B21D 53/76; B23P 17/00; G01D 15/00; G11B 5/127

(52) U.S. Cl. ........................................ 216/27; 29/890.1

(58) Field of Search .......................... 216/27; 29/890.1; 438/21; 347/20, 22, 29, 33, 34, 47, 71, 1, 2, 44, 45, 54, 61, 63–68, 101; 451/29–31, 38, 39, 41, 75; 219/121.6, 121.7, 121.71

(56) References Cited

U.S. PATENT DOCUMENTS

| | | | | |
|---|---|---|---|---|
| 3,846,905 A | | 11/1974 | Harper | |
| 4,009,113 A | * | 2/1977 | Green et al. | 510/312 |
| 4,254,197 A | | 3/1981 | Miura et al. | |
| 4,839,400 A | | 6/1989 | Sato et al. | |
| 4,950,583 A | * | 8/1990 | Brewer et al. | 430/311 |
| 5,043,363 A | | 8/1991 | Noguchi et al. | |
| 5,105,588 A | * | 4/1992 | Verley et al. | 451/102 |
| 5,180,757 A | | 1/1993 | Lucey | |
| 5,286,703 A | * | 2/1994 | Wachi et al. | 503/221 |
| 5,424,224 A | | 6/1995 | Allen et al. | |
| 5,454,928 A | * | 10/1995 | Rogers et al. | 205/125 |

(List continued on next page.)

FOREIGN PATENT DOCUMENTS

| | | | | | |
|---|---|---|---|---|---|
| DE | 4123900 | | * | 1/1993 | H01L/21/56 |
| JP | 62042426 | A2 | | 2/1987 | |
| JP | 63096907 | | | 4/1988 | |
| JP | 3266433 | A2 | | 11/1991 | |
| JP | 6310480 | | | 11/1994 | |
| JP | 7045569 | A2 | | 2/1995 | |

OTHER PUBLICATIONS

IBM Technical Disclosure Bulletin, "Inhibiting Adhesion of Silicon Particles to the Surface of a Silicon semiconductor Wafer During Laser dicing," (Sep. 7, 1972).

IBM Technical Disclosure Bulletin, "Coating protection for Laser Cutting and Welding Operations," (Jan. 7, 1976).

IBM Technical Disclosure Bulletin, "Substrate Protective Coating Process," (Nov. 7, 1978).

Polym.–Plast.Technol.Eng., 32 (1&2) 123–138 (1993), "Rheology of Water–Soluble Polymers: A comparative Study on the Effect of Monovalent Salt".

*Primary Examiner*—Gregory Mills
*Assistant Examiner*—Roberts Culbert
(74) *Attorney, Agent, or Firm*—Luedeka, Neely & Graham

(57) ABSTRACT

The invention provides an improved method for grit blasting slots in a silicon wafer. The method includes, providing a silicon wafer having a first surface and a second surface, the first surface containing resistive, conductive and insulative layers defining individual semiconductor components, applying a first substantially permanent non-water soluble layer selected from silane, photoresist materials and a combination of a silane layer and a photoresist layer to the first surface of the wafer to provide a first substantially permanent layer thereon, applying a water-soluble protective material to the first layer to provide a second layer, grit blasting slots in the wafer corresponding to the individual semiconductor components, and subsequently, removing the water-soluble protective layer from the wafer. The protective layer provides enhanced protection for the electrical components on a silicon wafer during a grit blasting process so that a higher yield of useable semiconductor chips may be made.

14 Claims, 3 Drawing Sheets

U.S. PATENT DOCUMENTS

| | | | | | |
|---|---|---|---|---|---|
| 5,476,752 | A | | 12/1995 | Noguchi et al. | |
| 5,543,266 | A | | 8/1996 | Noguchi et al. | |
| 5,585,221 | A | | 12/1996 | Noguchi et al. | |
| 5,597,767 | A | | 1/1997 | Mignardi et al. | |
| 5,668,062 | A | | 9/1997 | Hyun et al. | |
| 5,677,063 | A | * | 10/1997 | Kamiyama et al. | 428/411.1 |
| 5,696,177 | A | | 12/1997 | Noguchi et al. | |
| 5,719,605 | A | * | 2/1998 | Anderson et al. | 347/59 |
| 5,920,013 | A | | 7/1999 | Boardman et al. | |
| 6,045,214 | A | * | 4/2000 | Murthy et al. | 347/47 |
| 6,063,696 | A | | 5/2000 | Brenner et al. | |
| 6,093,240 | A | | 7/2000 | Matsumura et al. | |
| 6,402,301 | B1 | * | 6/2002 | Powers et al. | 347/63 |
| 6,409,312 | B1 | * | 6/2002 | Mrvos et al. | 347/54 |
| 6,448,313 | B1 | * | 9/2002 | Patel | 524/89 |

* cited by examiner

METHOD FOR MAKING INK JET PRINTHEADS

TECHNICAL FIELD

This invention relates to the field of ink jet printers. More particularly, this invention relates to improved manufacturing methods for making printheads and printhead components.

BACKGROUND OF THE INVENTION

Ink jet printers contain semiconductor chips which are electrically activated to eject ink droplets on demand through nozzle holes in a nozzle plate attached to the chips. In a "roof shooter" type printhead, ink is provided to the active surface of the chips for ink droplet ejection through ink vias or ink feed slots which are formed through the thickness dimension of the chips. In order to produce printhead chips in large quantities with minimum production costs, grit blasting is conventionally used to blast slots in a silicon wafer prior to dicing the wafer to form individual semiconductor chips. The silicon wafers are typically processed prior to grit blasting to contain insulative, conductive, resistive, passivation and/or cavitation layers which provide the active surface for ink ejection. During the grit blasting process, which is typically conducted from the side of the wafer opposite the active surface, some of the grit passing through the wafer may ricochet and impinge on the active surface side of the wafer thereby causing electrical shorts and open circuits. The shorts or open circuits must be repaired or the chips containing the damaged circuits discarded, these steps resulting in lower product yields and/or lower production rates. There is a need, therefore, for improved methods for grit blasting ink feed vias or slots in silicon wafers used to make ink jet printhead chips.

SUMMARY OF THE INVENTION

The foregoing and other needs are provided by an improved method for grit blasting slots in a silicon wafer. The method includes providing a silicon wafer having a first surface and a second surface, the first surface containing resistive, conductive and insulative layers defining individual semiconductor components, applying a first substantially permanent non-water soluble layer selected from silane, photoresist materials and a combination of a silane layer and a photoresist layer to the first surface of the wafer to provide a first substantially permanent layer thereon, applying a water-soluble protective material to the first layer to provide a second layer, grit blasting slots in the wafer corresponding to the individual semiconductor components. Each of the slots extend from the second surface of the wafer through the wafer and through the first and second layers. Subsequently, removing the water-soluble protective layer from the wafer.

In another aspect the invention provides a method for making ink jet printheads containing a silicon substrate with an ink feed via grit blasted therein. The method includes spin coating a substantially water-insoluble first material selected from the group consisting of a silane material, a photoresist material and a combination of silane and photoresist materials on a first surface of the silicon substrate wafer to provide a first layer. The first surface of the wafer preferably contains resistive, conductive and insulative layers defining individual semiconductor components. A substantially water-soluble protective material is spin-coated onto the first layer to provide a second layer. Ink vias are grit blasted in the wafer from a second surface side thereof opposite the first surface. Substantially all of the second layer is removed from the wafer. Nozzle plates are attached to the chips to provide nozzle plate/chip assemblies and the wafer is diced to provide individual nozzle plate/chip assemblies. TAB circuits or flexible circuits are electrically connected to the nozzle plate/chip assemblies and the nozzle plate/chip assemblies and connected circuits are adhesively attached to printhead bodies to provide ink jet printheads.

The first and/or second layers applied to the wafer provide enhanced protection to delicate electrical components on the wafer surface during wafer processing procedures such as grit blasting. The layers are selected so that the layers may be applied to the entire surface of the wafer with coating techniques such as spin coating so that the entire surface of the wafer is protected. Since the protective layer is preferably selected to be substantially completely removable from the first layer, any grit passing through the wafer from the second surface side to the device surface side of the wafer may be removed with the second layer.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE INVENTION

Figure 1A:
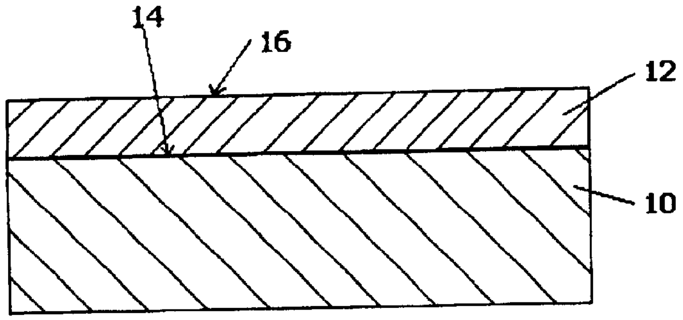
FIGS. 1A–1D are cross-sectional views not to scale illustrating a wafer processing step according to a first embodiment of the invention.

With reference to FIG. 1A, a silicon wafer 10 containing a first protective layer 12 is shown. The wafer 10 has a device surface 14 containing a plurality of layers including insulating, conductive, resistive, passivation and/or cavitation layers which together provide an active layer for ink ejection for individual chips made from the wafer 10. The silicon wafer 10 preferably has a thickness ranging from about 200 to about 800 microns and the active layer on the device surface 12 preferably has an overall thickness ranging from about 1 micron to about 5 microns, most preferably from about 2 to about 3 microns. The first layer 12 is deposited over the device surface 14 to provide a substantially planar surface 16 and/or to provide adhesion enhancement for attaching a nozzle plate thereto as described in more detail below.

With regard to the device surface 14 of the wafer 10, active devices such as heater resistors are attached to an insulating layer which is preferably a metal oxide layer, most preferably silicon dioxide having a thickness ranging from about 1.0 to about 2.0 microns. A phosphorous silicon glass (PSG) layer having a thickness ranging from about 1000 to about 1200 Ångstroms is preferably deposited over the insulating layer. A resistive material of tantalum/aluminum, or alpha phase tantalum is next deposited on at least a portion of the PSG layer. The resistive material provides heater resistors which upon activation urge ink to be ejected through the nozzle holes in the nozzle plate attached to the chip. The resistive material preferably has a thickness ranging from about 900 to about 1100 Ångstroms.

Conductive layers made of an aluminum/copper alloy, gold, beta phase tantalum, aluminum and the like are deposited on one or more portions of the resistive layer. The conductive layers provide electrical connection between the resistors and a printer controller. The conductive layers each preferably have a thickness ranging from about 5000 to about 6000 Ångstroms.

In order to protect the conductive and resistive layers from ink corrosion, passivation layers are preferably deposited over the resistive layer and conductive layers. The passivation layers may be a composite layer of silicon nitride and silicon carbide, or may be individual layers of silicon nitride and silicon carbide, respectively. The passivation layers are preferably deposited directly on the conductive layers and the resistive layer. It is preferred that the silicon carbide layer has a thickness ranging from about 2000 to about 3000 Ångstroms, most preferably from about 2600 Ångstroms. The silicon nitride layer preferably has a thickness ranging from about 4000 to about 5000 Ångstroms, most preferably about 4400 Ångstroms.

A cavitation or additional passivation layer of tantalum or diamond like carbon (DLC) is preferably deposited over at least a portion of the passivation layers, most preferably adjacent the heater resistor. The cavitation layer provides protection to the heater resistor during ink ejection operations which could cause mechanical damage to the heater resistor in the absence of the cavitation layer. The cavitation layer is believed to absorb energy from a collapsing ink bubble after ejection of ink from the nozzle holes. The cavitation layer thickness may range from about 2500 to about 7000 Ångstroms or more.

In order to adhesively attach a nozzle plate to the device surface 14 of a chip made from the wafer 10, the first layer 12 is preferably spin coated onto the device surface 14 of the wafer 10 (FIG. 1A). The first layer 12 is preferably derived from a group consisting of a silane material; a radiation and/or heat curable polymeric film material preferably containing a difunctional epoxy material, a polyfunctional epoxy material and suitable cure initiators and catalyst; and a silane material and radiation and/or heat curable polymeric film material. Particularly preferred materials for providing the first layer 12 include a silane adhesion promoter available from Dow Corning of Midland, Mich. under the trade name Z6032 and the polymeric photoresist material described in U.S. Pat. No. 5,907,333 to Patil et al., the disclosure of which is incorporated herein by reference as if fully set forth.

In the case of a silane material providing the first layer 12, the first layer 12 is relatively thin compared to silicon wafer 10 and may have a thickness ranging from about 1 Ångstroms to about 10 Ångstroms, preferably about 4 to about 8 Ångstroms and most preferably about 6 Ångstroms. If a photoresist material is selected to provide the first layer (described with respect to FIGS. 3A–3D below) or if a silane material and photoresist material are selected to provide the first layer (described with respect to FIGS. 2A–2D below), the thickness of the first layer 12 may range from about 1 to about 10 microns, most preferably about 2.5 microns.

It is preferred to deposit the first layer 12 over the entire device surface 14 of the wafer 10. Prior to grit blasting the ink vias or ink feed slots in the wafer 10, the photoresist material of the first layer 12 is selectively removed, i.e., "patterned", to provide ink chambers and windows for electrical connections to the conductive layers on the device surface 14. Patterning the photoresist material of the first layer 12 may be conducted by conventional photolithographic techniques.

Since the first layer 12 does not protect all of the delicate circuitry on the device surface 14, a second layer 18 is preferably applied to the first layer 12 to cover substantially the entire wafer surface including the patterned areas which expose the device surface 14 to mechanical damage. The second layer 18 is preferably derived from a material selected from the group consisting of substantially water soluble polymers, including but not limited to, polyacrylamide materials.

Figure 1B:
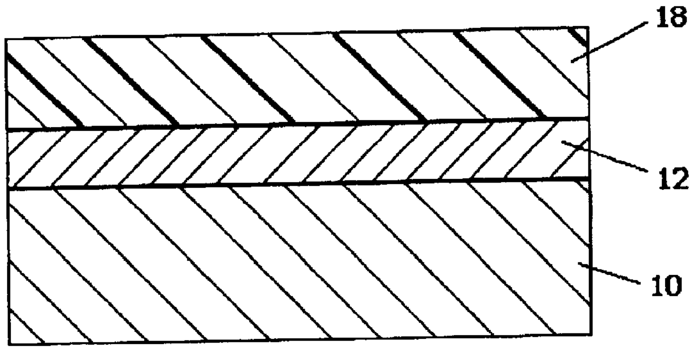

The second layer 18 is preferably a water-soluble polymeric material which is applied to the first layer 12 by a spin coating technique (FIG. 1B). Water-soluble polymeric materials for use as the second layer 18 include, but are not limited to, polyacrylamide, polyvinyl alcohol and polyethylene oxide. A preferred water-soluble polymeric material is polyacrylamide. When a polyacrylamide material is used to provide protective layer 18, the polyacrylamide layer 18 is preferably derived from a 50 wt. % polyacrylamide solution in water wherein the preferred polyacrylamide has a weight average molecular weight of about 10,000. Such a polyacrylamide is available from Aldrich Chemical Company of Milwaukee, Wis. under catalog no. 43,494-9. The foregoing aqueous solution of polyacrylamide is preferably applied to the first layer 12 to provide a second layer 18 having a thickness ranging from about 20 to about 25 microns or more as shown in FIG. 1B.

Figure 1C:
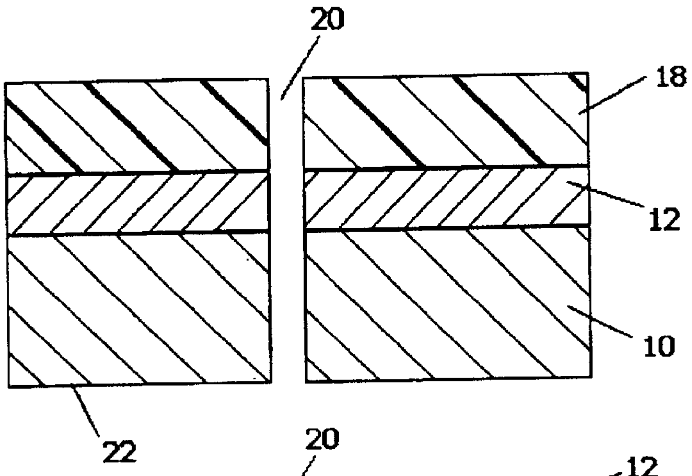

After applying the first and second layers 12 and 18 to the wafer 10, the wafer is grit blasted to abrasively form ink feed slots or ink vias 20 in the wafer (FIG. 1C). Grit blasting the wafer 10 is preferably conducted from a back side 22 opposite the device surface 14 containing the first and second layers 12 and 18. The slots or vias 20 typically have dimensions of about 9.7 millimeters long and about 0.4 millimeters wide. Individual ink jet chips made from the wafers 10 typically have dimensions ranging from about 2 to about 8 millimeters wide by about 10 to about 20 millimeters long. Each of the chips contains at least one ink feed slot or via 20. Abrasive materials used in the grit blasting process is preferably selected from alumina and silicon carbide. The average particle size of the abrasive material preferably ranges from about 15 to about 25 microns.

Figure 1D:
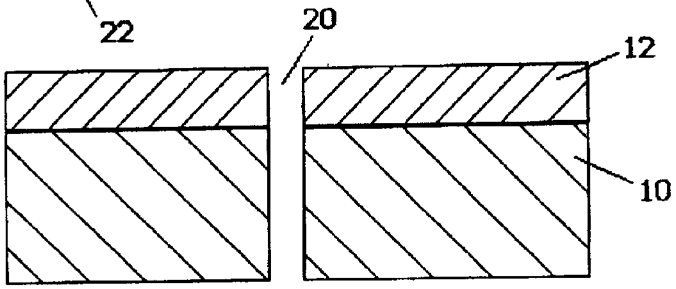

Subsequent to grit blasting the slots or vias 20 in the wafer 10, substantially all of the second layer 18 is removed from the wafer 10 as shown in FIG. 1D to provide a wafer containing the first layer 12 and ink slot or via 20. It will be recognized that abrasive material from the grit blasting step may impinge on and/or imbed in the second layer 18. Accordingly, removal of substantially all of the second layer 18 also effectively removes any abrasive material which may be attached to the second layer 18. It will also be recognized that since the protective material 18 covers the entire surface of the first layer and device surface 14 of the wafer 10, damage to the delicate device surface 14 is minimized during the slot or via forming process.

With regard to the process illustrated in FIGS. 1A–1D, the first layer 12 is preferably derived from a silane adhesion promoter material and the second layer 18 is derived from a water soluble polymeric material. Accordingly, the second layer 18 may be removed by washing the wafer 10 after conducting the grit blasting step.

Figure 2A:
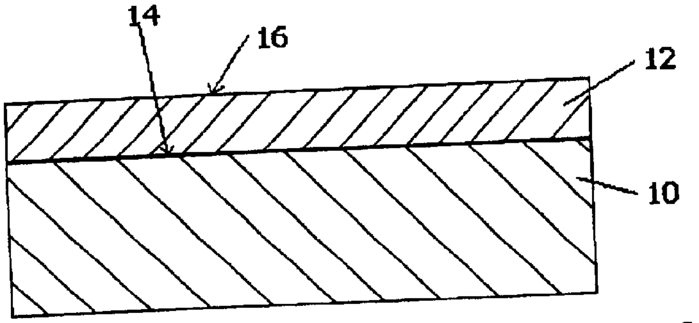
FIGS. 2A–2D are cross-sectional views not to scale illustrating a wafer processing step according to a second embodiment of the invention.
Figure 2B:
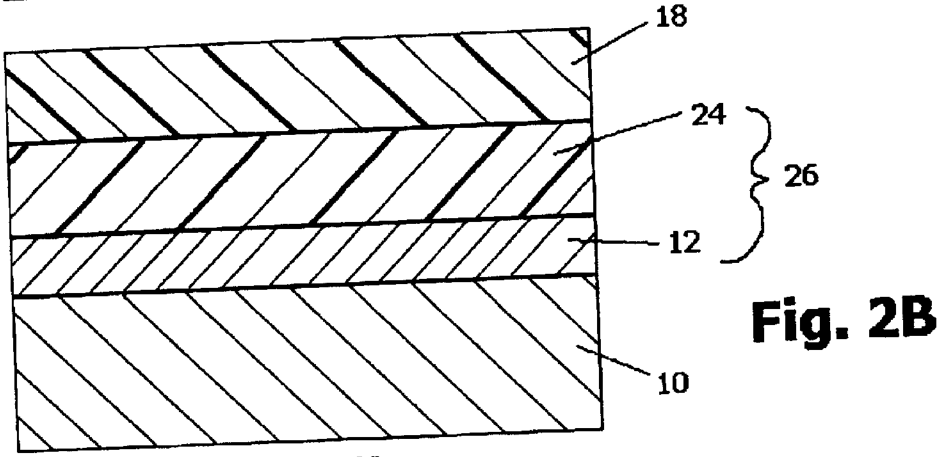

With reference to FIGS. 2A–2D, a second embodiment of the invention will now be described. As shown in FIG. 2A, a first layer 26, preferably includes a material derived from a silane adhesion promoter material as described above applied to the device surface 14 of the wafer 10. The first layer 26 also includes a substantially water-insoluble polymeric material 24 applied to the silane material 12. The silane material 12 preferably has a thickness ranging from about 1 to about 10 Ångstroms and the polymeric material 24 preferably has a thickness ranging from about 1 to about 10 microns. Next a substantially water-soluble polymeric protective material is applied to the first layer 26 to provide layer 18. The protective layer 18 preferably has a thickness ranging from about 20 to about 25 microns and is preferably derived from a polyacrylamide material as set forth above.

The photoresist material provides a layer 24 with a thickness ranging from about 1 to about 10 microns and is derived from materials including acrylic and epoxy-based photoresists such as the photoresist materials available from Clariant Corporation of Somerville, N.J. under the trade names AZ4620 and AZ1512. Other photoresist materials are available from Shell Chemical Company of Houston, Tex. under the trade name EPON SU8 and photoresist materials available from Olin Hunt Specialty Products, Inc., a subsidiary of the Olin Corporation of West Paterson, N.J. under the trade name WAYCOAT. A particularly preferred photoresist material includes from about 10 to about 20 percent by weight difunctional epoxy compound, less than about 4.5 percent by weight multifunctional crosslinking epoxy compound, and from about 1 to about 10 percent by weight of a photoinitiator capable of generating a cation, and from about 20 to about 90 percent by weight non-photoreactive solvent as described in U.S. Pat. No. 5,907,333 to Patil et al., the disclosure of which is incorporated by reference herein as if fully set forth.

Figure 2C:
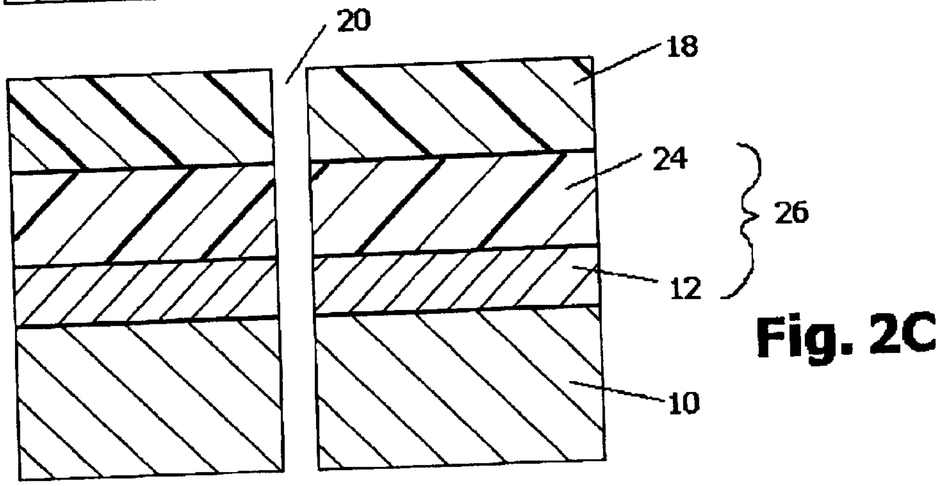
Figure 2D:
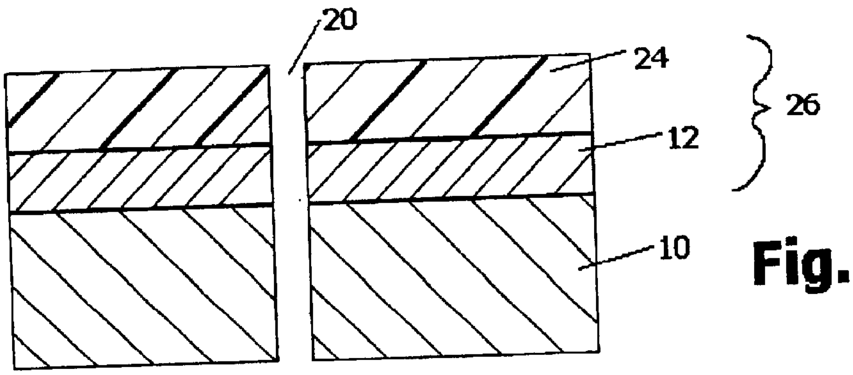
Figure 3A:
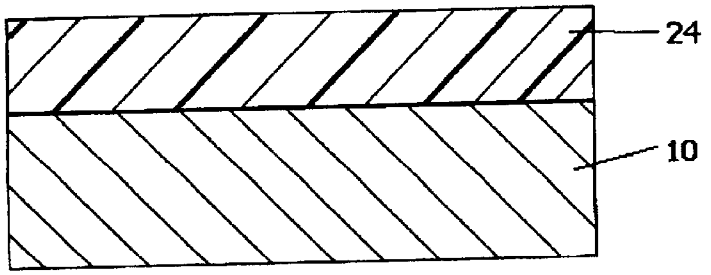
FIGS. 3A–3D are cross-sectional views not to scale illustrating a wafer processing step according to a third embodiment of the invention.
Figure 3B:
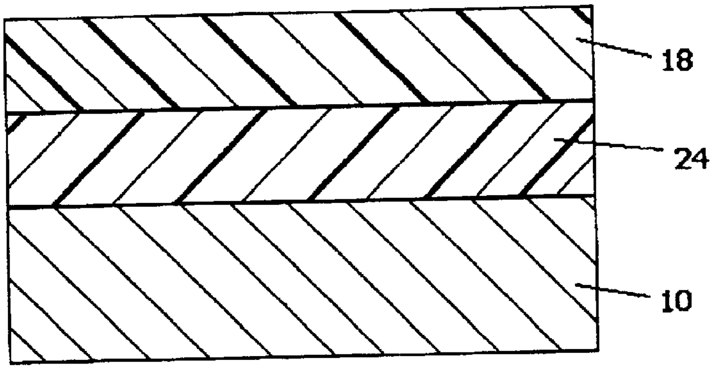
Figure 3C:
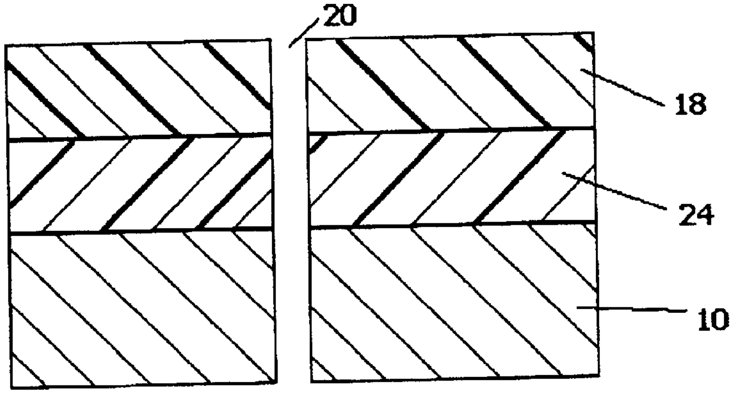
Figure 3D:
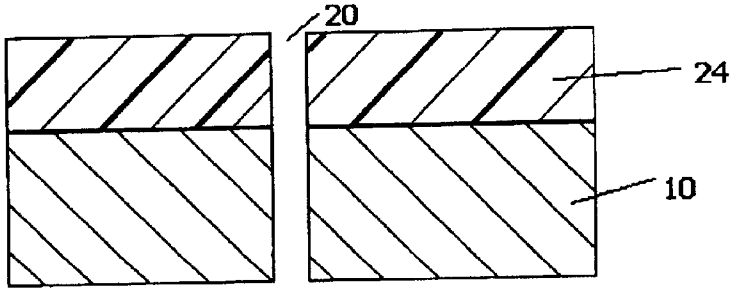

As shown in FIG. 2C and described in detail above, an ink feed slot or ink via 20 is abrasively formed in the silicon wafer 10, first layer 26, and second layer 18. After forming the ink feed slot or via 20, the substantially water-soluble protective layer 18 containing imbedded abrasive material is removed from the first layer 26 preferably by dissolving the protective layer 18 in a water washing procedure. The resulting wafer as shown in FIG. 2D preferably includes a first layer containing a silane material 12 and a photoresist material 24.

According to FIGS. 3A–3D, a third embodiment of the invention will now be described. According to this embodiment, the first layer 24 is derived from a photoresist material as set forth above. The first layer 24 preferably has a thickness ranging from about 1 to about 10 microns and is patterned as set forth above with reference to FIGS. 1A–1D. Next, the second layer 18, preferably derived from a substantially water-soluble polymeric material, preferably a polyacrylamide material as described above, is applied to the first layer 24. The second layer preferably has a thickness ranging from about 20 to about 25 microns.

After forming the ink feed slots or vias 20 through the wafer 10, the first layer 24 and the second layer 18, the second layer 18 is preferably removed from the first layer 24 by washing as described above to provide the wafer illustrated in FIG. 3D containing only first layer 24 thereon. Accordingly, abrasive material adhered to or imbedded in the second layer 18 is also removed with the second layer 18.

Figure 4:
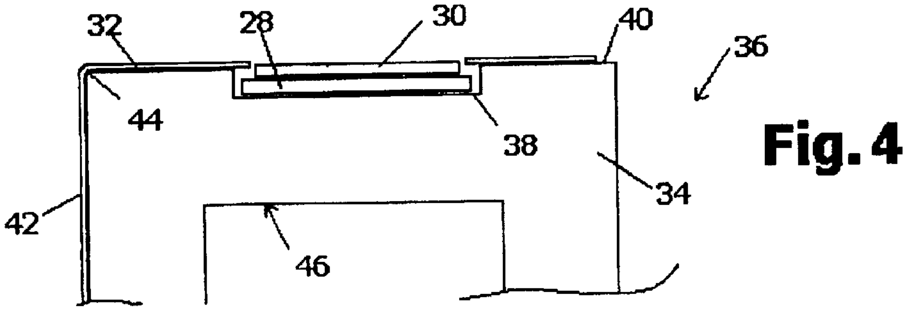
FIG. 4 is a cross-sectional view not to scale of an ink jet printhead made according to the invention.

A nozzle plate 30 is then preferably adhesively attached to the first layer 12, 26 or 24 (FIGS. 1D, 2D and 3D) remaining on the chip to provide a nozzle plate/chip assembly 28/30 (FIG. 4). The nozzle plate 30 may be made of metals or plastics and is preferably made of a polyimide polymer which is laser ablated to provide ink chambers, nozzle holes, and ink supply channels herein. The adhesive used to attach the nozzle plate 30 to the chip 28 is preferably any B-stageable material, including some thermoplastics. Examples of B-stageable thermal cure resins include phenolic resins, resorcinol resins, urea resins, epoxy resins, ethylene-urea resins, furane resins, polyurethanes, and silicone resins. Suitable thermoplastic, or hot melt, materials include ethylene-vinyl acetate, ethylene ethylacrylate, polypropylene, polystyrene, polyamides, polyesters and polyurethanes. The adhesive is preferably applied with a thickness ranging from about 1 to about 25 microns. In the most preferred embodiment, the adhesive is a phenolic butyral adhesive such as that used in RFLEX R1100 or RFLEX R1000 films, commercially available from Rogers of Chandler, Ariz. Once the nozzle plates 30 are attached to the wafers 10, and the adhesive used to attach the nozzle plates 30 is cured, the wafers 10 are diced to provide individual nozzle plate/chip assemblies 30/28 such as the nozzle plate/chip assembly 30/28 shown in FIG. 4.

A flexible circuit or tape automated bonding (TAB) circuit 32 is attached to the nozzle plate/chip assembly 30/28 to provide a nozzle plate/chip/circuit assembly 30/28/32. The nozzle plate/chip/circuit assembly 30/28/32 is preferably adhesively attached to a printhead body portion 34 to provide a printhead 36 for an ink jet printer. The nozzle plate/chip assembly 30/28 may be attached as by means of a die bond adhesive, preferably a conventional die bond adhesive such as a substantially transparent phenolic polymer adhesive which is commercially available from Georgia Pacific under the product designation "BKS 2600", in a chip pocket 38 of a printhead body portion 34. The flexible circuit or TAB circuit 32 is adhesively attached to surface 40 of the printhead body portion 34 after attaching the nozzle plate/chip assembly 30/28 in the chip pocket 38. A portion 42 of the flexible circuit or TAB circuit 32 is preferably folded around edge 44 of the body portion 34 to provide locations for electrical contact to a printer controller in the ink jet printer.

Ink supplied from an ink reservoir adjacent an ink surface 46 of the printhead body portion 34 flows through an ink path in the body portion 34 and through the ink via or slot 20 described above to the device surface 14 of the chip. Activation of the devices on the device surface 14 of the chip causes ink to be ejected through nozzle holes in the nozzle plate 30.

It is contemplated, and will be apparent to those skilled in the art from the preceding description and the accompanying drawings, that modifications and changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. In a method for forming one or more slots in a silicon wafer containing a first surface and a second surface opposite the first surface, the improvement comprising the steps of:

forming a substantially permanent non-water soluble first layer on the first surface of the wafer from a material selected from the group consisting of silane materials, photoresist materials, and a combination of silane and photoresist materials;

applying a water-soluble protective material to the first layer to form a protective second layer thereon;

forming one or more slots in the silicon wafer extending through the wafer from the first surface to the second surface thereof; and removing the water-soluble second layer from the wafer.

2. The method of claim 1 wherein the protective material comprises a water-soluble polyacrylamide.

3. The method of claim 1 wherein the protective material is derived from a polyacrylamide material and the protective material is applied to a silane adhesion promoter layer as the first layer.

4. The method of claim 1 wherein slot forming step is conducted using a grit blast material selected from alumina and silicon carbide.

5. The method of claim 1 wherein the first layer comprises a silane adhesion promoter layer and a photoresist layer and the protective layer comprises a polyacrylamide layer, further comprising substantially removing the polyacrylamide layer subsequent to the slot forming step to provide a wafer containing the silane layer and the photoresist layer.

6. The method of claim 1 comprising applying a silane adhesion promoter material to the first surface of the wafer before applying the protective material to the wafer.

7. The method of claim 6 wherein the protective material comprises a polyacrylamide material.

8. In a method for making ink jet printheads from a silicon wafer having a device surface side and one or more ink feed vias grit blasted therein for ink feed to the device surface side thereof, the ink jet printheads including nozzle plates attached to the device surface side of the wafer, providing nozzle plate/chip assemblies, and TAB circuits or flexible circuits electrically connected to the nozzle plate/chip assemblies, the improvement comprising:

spin coating a substantially water-insoluble first material on a the device surface side of a silicon wafer to form a first layer thereon, the first material being selected from the group consisting of a silane material, a photoresist material, and a combination of silane material and photoresist material;

spin coating onto the first layer a substantially water-soluble protective material to provide a second layer on the first surface of the wafer;

grit blasting one or more ink vias in the wafer extending from a second surface thereof to the device surface side of the wafer and removing substantially all of the second layer from the wafer.

9. The method of claim 8 wherein the grit blasting step is conducted using a grit blast material selected from alumina and silicon carbide.

10. The method of claim 8 wherein the first layer comprises a photoresist layer and the second layer comprises a polyacrylaniide layer applied to the photoresist layer.

11. The method of claim 10 further comprising removing substantially all of the polyacrylamide layer after grit blasting the wafer.

12. The method of claim 11 wherein the grit blasting step is conducted using a grit blast material selected from alumina and silicon dioxide.

13. The method of claim 8 wherein the first layer comprises a photoresist material having a thickness ranging from about 1 to about 10 microns.

14. The method of claim 13 wherein the second layer has a thickness ranging from about 20 to about 25 microns.

* * * * *